United States Patent [19]
Arias et al.

[11] Patent Number: 6,005,522
[45] Date of Patent: Dec. 21, 1999

[54] ANTENNA DEVICE WITH TWO RADIATING ELEMENTS HAVING AN ADJUSTABLE PHASE DIFFERENCE BETWEEN THE RADIATING ELEMENTS

[75] Inventors: Mario Arias, Vallentuna; Stefan Jonsson, Skarpnäck, both of Sweden; Witold M. Balawejder, Arlington, Tex.

[73] Assignee: Allgon AB, Akersberga, Sweden

[21] Appl. No.: 09/285,071

[22] Filed: Apr. 2, 1999

Related U.S. Application Data

[63] Continuation of application No. 08/750,713, Dec. 17, 1996, abandoned.

[30] Foreign Application Priority Data

May 16, 1995 [SE] Sweden ................................. 9501830

[51] Int. Cl.[6] ............................................... H01Q 9/16
[52] U.S. Cl. ................................. 343/700 MS; 343/778; 343/820; 343/856
[58] Field of Search ........................... 343/700 MS, 702, 343/795, 820, 856, 778, 822, 852, 858, 860; H01Q 9/16

[56] References Cited

U.S. PATENT DOCUMENTS

| | | | |
|---|---|---|---|
| 2,573,914 | 11/1951 | Landon | 250/33.65 |
| 2,860,339 | 11/1958 | Kandoian | 343/795 |
| 2,978,703 | 4/1961 | Kuecken | 343/795 |
| 3,611,400 | 10/1971 | Nagai et al. | 343/844 |
| 3,854,140 | 12/1974 | Ranghelli et al. | 343/814 |
| 4,356,492 | 10/1982 | Kaloi | 343/846 |
| 4,427,984 | 1/1984 | Anderson | 343/764 |
| 4,713,670 | 12/1987 | Makimoto et al. | 343/700 |
| 4,758,843 | 7/1988 | Agrawal et al. | 343/700 |
| 4,766,440 | 8/1988 | Gegan | 343/700 |
| 5,382,959 | 1/1995 | Pett et al. | 343/700 |
| 5,532,707 | 7/1996 | Klinger et al. | 343/793 |
| 5,724,051 | 3/1998 | Mailandt et al. | 343/795 |

OTHER PUBLICATIONS

Patent Abstract for JP-A-62-134241 filed May 27, 1987, Mitsubishi Electric Corp., Shintaro Nakahara.

*Primary Examiner*—Don Wong
*Assistant Examiner*—Tho Phan
*Attorney, Agent, or Firm*—Jacobson, Price, Holman & Stern, PLLC

[57] ABSTRACT

Antenna devices, including a pair and larger arrays of radiators, wherein each pair is to be connected to a first transmission line having a first characteristic impedance Z1. Each pair includes at least first and second radiating elements (1, 2) and first and second impedance transformers (3, 4) for the first and second radiating elements. One side of each transformer is connected to the respective element. The other sides are inter-connected by a second transmission line (8) to which their impedances are matched. The second transmission line has a resistive first impedance R1 equal to twice the first characteristic impedance Z1. The first transmission line is to be connected to the second transmission line at a selected one of many possible contact points (9). The selected contact point then determines a signal phase difference between said first and second radiating elements.

17 Claims, 2 Drawing Sheets

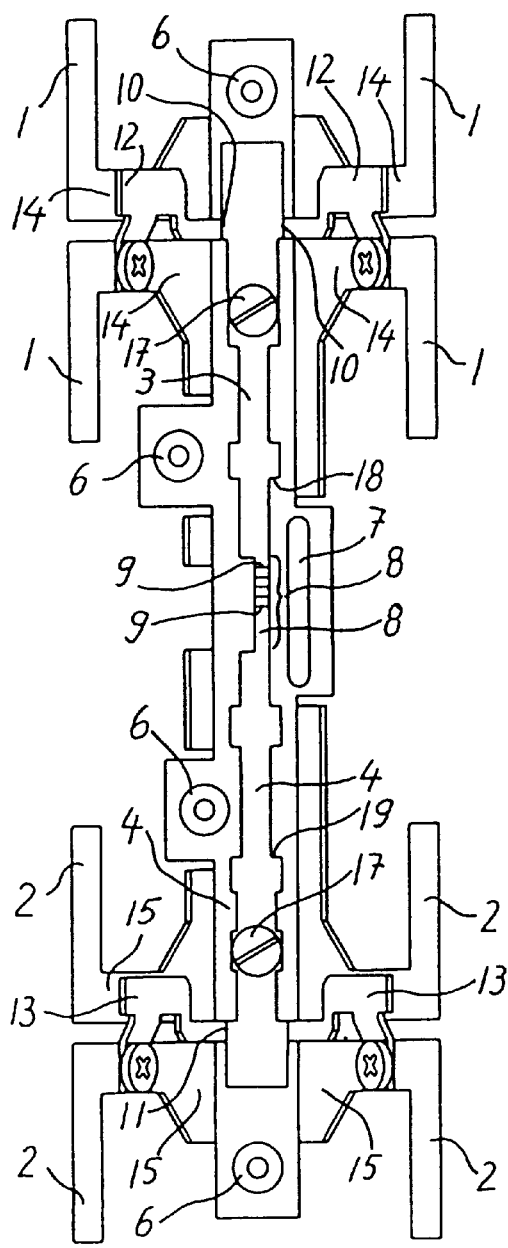
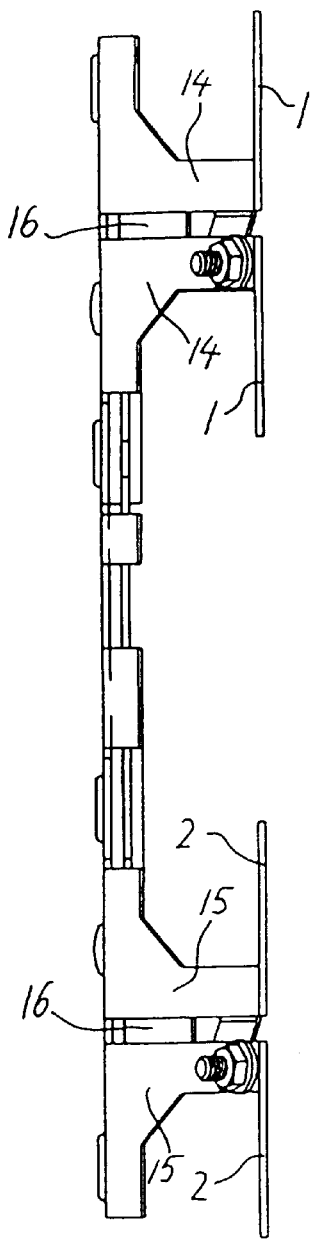
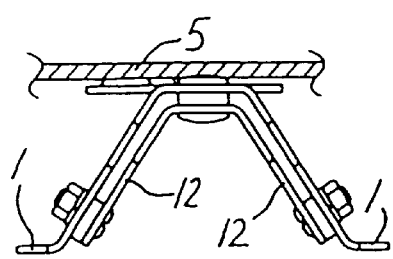

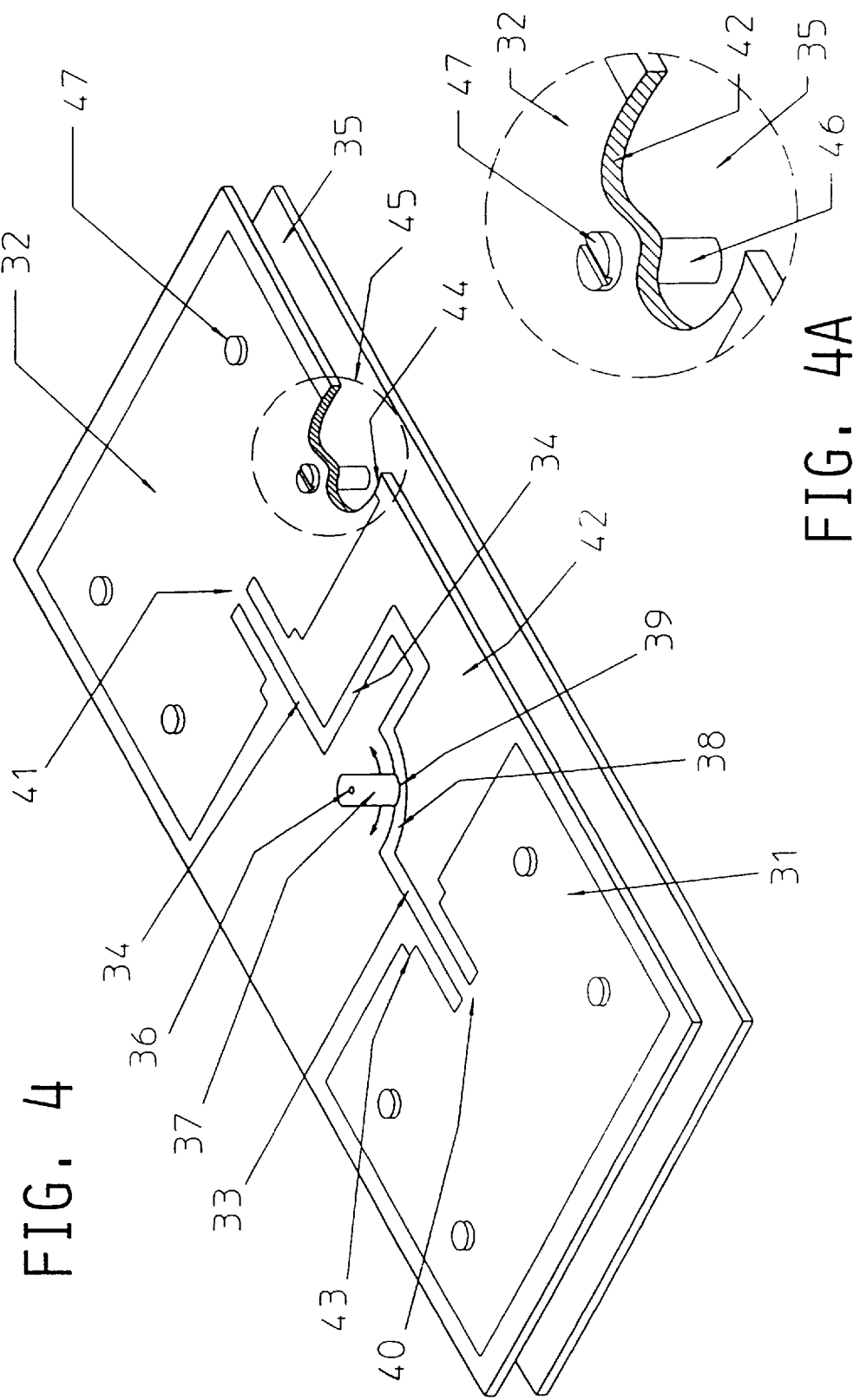

ANTENNA DEVICE WITH TWO RADIATING ELEMENTS HAVING AN ADJUSTABLE PHASE DIFFERENCE BETWEEN THE RADIATING ELEMENTS

This is a Continuation of application Ser. No. 08/750,713 filed Dec. 17, 1996, now abandoned which in turn is a §371 nationalization of PCT/SE96/00627 filed May 14,1996.

FIELD AND BACKGROUND OF THE INVENTION

The present invention relates to a radio communication antenna device with two radiating elements or groups of radiating elements, the signal phase difference of which is adjustable. More specifically the invention relates to an antenna device with two radiating elements or groups of radiating elements interacting to produce a directional radiation beam, the direction of which being adjustable through adjusting said phase difference. The invention may even be applied to direct beams from omni-directional or 360° radiating elements.

PRIOR ART

In directional beam antenna devices in, e.g., a cellular telephone system it may be desirable to use antennas which may be adjusted to or pre-set at a specific beam direction or tilt in order to make an efficient use of radiated energy and to provide efficient reception of incident radiation. A mechanical/geometric adjustability of the antenna means is known in the prior art, but, in the case of a multi-radiator antenna device, an electrical adjustability is more suitable with regard to, e.g., steady mounting of the antenna device. However, electrically adjustable prior art devices require a rather complicated design and permits small variations only in the manufacture and assembly of the antenna device. An electrically adjustable beam antenna device is disclosed in Patent Abstracts of Japan relating to Japanese Patent Application No. 63-134241. That device includes means for varying delays in feed lines to different radiating elements in an array.

SUMMARY OF THE INVENTION

It is a main object of the invention to provide an antenna device wherein an electrical adjustability is achieved and the number and/or lengths of connecting cables/feed transmission lines is reduced. The reduction of the number of cables generally leads to a smaller required number of transformer housings as well. Another object is to reduce the number of components of the antenna device by integration of components. Another object is to provide a mechanically durable and electrically well-defined antenna device. Another object is to provide (identical or a pre-defined set of) modular antenna devices that may be assembled into a variety of antenna configurations exhibiting different parameters and performances. Another object is to provide an antenna device suitable for radio communication, e.g., cellular telephone systems operating at ultrahigh frequencies or higher, where great care in component selection and placement is required. An antenna device with a combination of the above features is more efficient regarding materials, manufacture, and assembly than prior art antenna devices.

These and other objects are attained in an antenna device according to the characterizing portion of the appended claims. In fact only half the number or less of feed transmission lines is required in the antenna device of the invention compared to prior art antenna devices. Below, details and advantages of the present invention will be mentioned and/or further explained.

The first and second radiating elements may, as indicated, consist of more than one radiating element, respectively. Each of the first and second radiating means may consist of a group of radiating means. A signal in the radiating elements of such a group are preferably in phase with each other, but may differ in phase for various interaction effects.

Although described as having one first and one second radiating element, or element groups, it may be advantageous to arrange two or more of the antenna device of the invention, or other radiating elements, in order to obtain interaction resulting in, e.g., a more concentrated radiation beam with a longer range. The principles of arranging a multi-radiator antenna device are known per se, but the antenna device of the invention offers great improvement as outlined above.

The antenna device is to be connected via the first transmission line to a radio transmitting and/or receiving device in a well-known manner. However the connection between the first transmission line and the second transmission line is important in the antenna device of the invention. This connection constitutes substantially a pure current division, since the first transmission has half the characteristic impedance of the second transmission line. Thus the energy of a signal propagating in the first transmission line toward the contact point is split in equal halves propagating in each direction from the contact point in the second transmission line, vice versa.

This implies that the choice of contact point effects substantially the length of the signal path only from the contact point to the respective radiating element (or group of radiating elements). Apparently, there is a linear relationship between the position of the contact point on the second transmission line and the phase difference between the signal phase in the radiating elements.

As a borderline case, in order to obtain a largest possible phase difference between the first and second radiating elements, the connection point for the first transmission line may be selected slightly outside a portion of the second transmission line, which portion has a substantially constant and resistive characteristic impedance. Although matching, phase and power-splitting properties will vary outside that portion, in the direction of one of the radiating elements, it would thus be possible to make such a selection of the contact point. However, to some extent that would lead to deterioration in antenna performance.

The conductive ground means (reflector), which may be a continuous metal plate ground plane, has a predetermined orientation and position in relation to the first and second radiating elements in order for the radiating elements to give well-defined beam direction and radiation element impedance properties.

The first and second impedance transformer means perform matching of the impedance of the radiating element, in combination with the balun means wherever applicable, to the impedance of the second transmission line.

Each impedance transformer may be formed by a first elongated (possibly including curves or bends) conductive element (possibly formed by part of said conductive ground means) and, extending alongside thereof or substantially parallel thereto and separated from it, a second elongated conductive element, together defining sections with different characteristic impedance along their extension.

The second conductive element comprising a step in cross-sectional dimensions between two adjacent sections so as to obtain a change of characteristic impedance. The change in characteristic impedance may also be achieved through a change of a dielectric between the conductive elements.

The second conductive element may comprise a step in cross-sectional dimensions between two adjacent sections so as to obtain a change of characteristic impedance.

The second transmission line may be formed by a third elongated (possibly including curves or bends) conductive element (possibly formed by part of said conductive ground means) and, alongside thereof or substantially parallel thereto and separated from it, a fourth elongated conductive element.

The second transmission line may have a curved (arced) path in a plane perpendicular to the first transmission line partly encircling one conductor of the first transmission line.

The radiating elements of the antenna device or group of antenna devices may be arranged in an substantially plane and orthogonal matrix with a radiator center-to-center distance in one dimension being approximately one wavelength or less, 0.9–1.0 wavelengths being a preferred value range.

The first and second radiating element, the first and second transformers, and the second transmission line may together form one structural unit mounted on the conductive ground means.

The first and third connecting means of the first impedance transformer may be coupled via a first and second balun means to the first and second radiating elements, respectively.

The radiating elements and/or the elongated conductive elements may be comprised of single metal plate element(s).

The second transmission line may be provided with marks indicating possible positions of the contact point each giving a predetermined phase difference in the signal between the first and second radiating elements.

The second transmission line may have at least an electrical length of substantially equal to or less than one eighth of a wavelength.

The radiating elements may advantageously be oriented in the same direction (of polarization or phase).

BRIEF DESCRIPTION OF THE DRAWINGS

FIG. 1 shows a top view of an antenna device according to the invention mounted on a ground plane (not shown) and to be connected to a first transmission line, including two groups of radiating dipole elements, balun means, impedance transformers, and a second transmission line, formed from essentially two formed metal plate elements.

FIG. 2 shows a first side view of the antenna device of FIG. 1.

FIG. 3 shows a second side view of the antenna device of FIG. 1 indicating also the ground plane on which the antenna device is mounted.

FIG. 4 shows a perspective view with a cut-away section and a partial enlargement of another antenna device according to the invention to be connected to a first transmission line, including a ground plane, two radiating microstrip patch elements on a substrate parallel to and spaced from the ground plane, impedance transformers, and a second transmission line.

DETAILED DESCRIPTION OF PREFERRED EMBODIMENTS OF THE INVENTION

With reference to FIGS. 1–3 an antenna device is described having two first radiating dipole means 1, fed in phase and separated by less than one half wavelength and being parallel to each other, and two second radiating dipole means 2, fed in phase and each being oriented aligned with a respective one of the first radiating elements 1 at a center-to-center distance in the order of one half wavelength. Each dipole 1, 2 has a length of approximately one half wavelength and is oriented parallel to a conductive ground plane reflector 5 at a distance of approximately one quarter of a wavelength.

The first and second radiating elements 1, 2 are fed from a first and second impedance transformers 3, 4, via first and second balun means 12 and 14, 13 and 15, respectively. The first and second impedance transformers are interconnected by a second transmission line 8.

The dipoles 1, 2, parts 14, 15 of the balun means, and signal ground conductors of the impedance transformers 3, 4 each being a first elongated conductive element, and signal ground conductor of the second transmission line 8, being a third elongated conductive element, are formed (punched) from one first metal plate constituting a bottom portion of the antenna device. This bottom portion is provided with relatively low downwards projecting warts 6 which are fastened to the reflector 5 with screws and nuts (not shown) for well-defined electrical contact points, adjacent ones of which are to be separated by less than one half wavelength.

Parts 12, 13 of the balun means, signal transmitting parts of the impedance transformers 3, 4, each being a second elongated conductive element, and signal transmitting part of the second transmission line 8, being a fourth elongated conductive element, are formed by one second metal plate constituting a top portion of the antenna device fastened to a lower part of the bottom portion and, parallel to and spaced from the bottom portion, by non-conductive fastening elements 17 and at the balun means with conductive fastening means. To be advantageous in large scale manufacturing, the second plate may be produced by punching.

The upper part of the first and second impedance transformers 3, 4 have widths varying in steps 18, 19, respectively, along their extension providing different characteristic impedance in sections, which allow an effective impedance match between the balun means, connected to the antenna, and the second transmission line 8, having a characteristic impedance of 100 ohms. A first transmission line (not shown) to be connected to the antenna means is a 50 ohms coaxial line. It is to be mounted in a grounding and fastening block (not shown) that can be fasten and grounded at any point along a slot 7 in the bottom portion. The center conductor of the coaxial line is to be soldered at any position along the upper part of the second transmission line 8, that position determining the phase difference of the signal at the first and second radiating elements 1, 2. There are marks 9 on the second transmission line 8 for guiding in the selection of an intended phase difference.

Further antenna devices of the type shown in FIGS. 1–3 may be arranged (in a matrix) on the same ground plane (reflector) to interact with the radiators of the first antenna device similarly to the way these interact with each other.

With reference to FIG. 4 an antenna device is described formed by partly microstrip printed circuits on a plane non-conductive substrate 42 including a first radiating patch element 31 fed at 40 by a first impedance transformer 33, 43 connecting and matching the first patch element 31 to an arced transmission line 38 of 100 ohms connected to a second impedance transformer 34 that matches the second transmission line 38 and a second radiating patch element 32 connected at 41, a second radiating patch element 32 oriented in a mirror-like fashion in relation to the first radiating patch element 31, partly a conductive reflector 35 supporting the substrate 42 on equal separating and fastening means 46, 47. A coaxial feed line is entered perpendicularly to the substrate and is contacted to the second transmission line via its center conductor 36 and a segment 37 to a point 39 determining the phase difference, all in a similar way to what is said above. For clarity FIG. 4 includes a cut-away portion 44 and an enlarged portion 45.

We claim:

1. An antenna device to be connected to a first transmission line with a first characteristic impedance Z1, said antenna device comprising:

at least one first radiating element;

at least one second radiating element;

a first impedance transformer means having first and second connecting means, said first connecting means coupled to said first radiating element;

a second impedance transformer means having third and fourth connecting means, said third connecting means coupled to said second radiating element, said first impedance transformer means at said second connecting means, and said second impedance transformer means at said fourth connecting means, having a substantially equal and substantially resistive first impedance R1 and being substantially equal to twice said first characteristic impedance Z1;

an elongated second transmission line, having first and second ends and a first length, with a second characteristic impedance Z2 substantially equal to said first impedance R1;

said second and fourth connecting means connected to said first and second ends, respectively;

wherein said second transmission line is connected to said first transmission line at a contact point located along the second transmission line at a location providing a signal phase difference between said first and second radiating elements.

2. The antenna device according to claim 1, wherein said antenna device further comprises a conductive ground means, said first radiating element having a predetermined separation from said conductive ground means and said second radiating element having a predetermined separation from said conductive ground means.

3. The antenna device according to claim 1, wherein each of the first and second impedance transformers are formed by a first elongated conductive element and, alongside thereof and separated from the first elongated conductive element, a second elongated conductive element, the first and second elongated conductive elements having lengths and sections with different characteristic impedances along the lengths.

4. The antenna device according to claim 3, wherein said second transmission line is formed by a third elongated conductive element and, alongside thereof and separated from the third elongated conductive element, a fourth elongated conductive element.

5. The antenna device according to claim 4, wherein said first and second radiating elements and said first and third elongated conductive elements are comprised of a single metal plate element.

6. The antenna device according to claim 4, wherein said first and second radiating elements and said second and fourth elongated conductive elements are comprised of a single metal plate element.

7. The antenna device according to claim 1, wherein said second transmission line is formed by a third elongated conductive element and, alongside thereof and separated from the third elongated conductive element, a fourth elongated conductive element.

8. The antenna device according to claim 1, wherein said second transmission line has a curved path in a plane perpendicular to said first transmission line partly encircling a conductor of said first transmission line.

9. The antenna array composed by at least one antenna device according to claim 1 wherein said radiating elements of said antenna device(s) are arranged in a substantially plane and orthogonal matrix with a center-to-center distance in one dimension being in the order of one wavelength.

10. The antenna device according to claim 1, wherein said first and second radiating element(s), said first and second transformers, and said second transmission line together from a single body structural unit mounted on said conductive ground means.

11. The antenna device according to claim 1, wherein said first and third connecting means of said first and second impedance transformer is coupled via a first and second balun means to said first and second radiating element(s), respectively.

12. The antenna device according to claim 1, wherein said first and second radiating elements and said second transmission line are comprised of a single metal plate element.

13. An antenna device to be connected to a first transmission line having a first characteristic impedance Z1, said antenna device comprising:

a first radiating element;

a first impedance transformer having a first connecting means coupled to said first radiating element, and a second connecting means, the first impedance transformer providing a resistive first impedance R1 at the second connecting means that is substantially equal to twice the first characteristic impedance Z1;

an elongated second transmission line having a first and second end and a second characteristic impedance Z2 substantially equal to said first impedance R1, the first end of said second transmission line connected to the second connecting means of said first impedance transformer;

a second impedance transformer having third and fourth connecting means, the fourth connecting means coupled to the second end of said second transmission line, said second impedance transformer providing a resistive second impedance R2 at the fourth connecting means that is substantially equal to the first impedance R1; and, a second radiating element connected to the third connecting means of said second impedance transformer, the first transmission line adjustably connecting to a contact point located along a length of second transmission line to provide an adjustable signal phase difference between said first and second radiating elements.

14. The antenna device according to claim 13, wherein each of the first and second impedance transformers are formed by a first elongated conductive element and, alongside thereof and separated from the first elongated conductive element, a second elongated conductive element, the first and second elongated conductive elements having lengths and sections with different characteristic impedances along the lengths.

15. The antenna device according to claim 14, wherein said second transmission line is formed by a third elongated conductive element and, alongside thereof and separated from the third elongated conductive element, a fourth elongated conductive element.

16. The antenna device according to claim 15, wherein said first and second radiating elements and said first and third elongated conductive elements are comprised of a single metal plate element.

17. The antenna device according to claim 15, wherein said first and second radiating elements and said second and fourth elongated conductive elements are comprised of a single metal plate element.

* * * * *

UNITED STATES PATENT AND TRADEMARK OFFICE
CERTIFICATE OF CORRECTION

PATENT NO. : 6,005,522
DATED : 12/21/99
INVENTOR(S) : Arias et al.

It is certified that error appears in the above-identified patent and that said Letters Patent is hereby corrected as shown below:

Column 3, line 57, after "and" insert --Fig. 4a shows--

Column 4, line 59, change "fig. 4" to --Figs. 4 and 4a--

Column 5, line 9, after "and" insert --Fig. 4a includes--

Signed and Sealed this

Sixth Day of June, 2000

Attest:

Q. TODD DICKINSON

Attesting Officer

Director of Patents and Trademarks